(12) United States Patent
Vantipalli et al.

(10) Patent No.: US 11,315,198 B2
(45) Date of Patent: Apr. 26, 2022

(54) DATA ANALYSIS ENGINE

(71) Applicant: The Bureau of National Affairs, Inc., Arlington, VA (US)

(72) Inventors: Rajesh Vantipalli, Ashburn, VA (US); Sarah Goretski, Lynn Township, MI (US); Mark Baker, Oak Hill, VA (US); Diane Tinney, Alexandria, VA (US); Kenneth B. Crutchfield, Alexandria, VA (US)

(73) Assignee: The Bureau of National Affairs, Inc., Arlington, VA (US)

( * ) Notice: Subject to any disclaimer, the term of this patent is extended or adjusted under 35 U.S.C. 154(b) by 844 days.

(21) Appl. No.: 15/223,843

(22) Filed: Jul. 29, 2016

(65) Prior Publication Data

US 2018/0033094 A1 Feb. 1, 2018

(51) Int. Cl.
*G06Q 40/00* (2012.01)
*G06Q 30/02* (2012.01)

(52) U.S. Cl.
CPC ....... *G06Q 40/123* (2013.12); *G06Q 30/0201* (2013.01)

(58) Field of Classification Search
CPC ... G06Q 40/123; G06Q 40/10; G06Q 30/0201
See application file for complete search history.

(56) References Cited

U.S. PATENT DOCUMENTS

| | | | | |
|---|---|---|---|---|
| 7,836,394 B2 * | 11/2010 | Linder | ......... | G06Q 40/00 715/234 |
| 7,937,313 B2 * | 5/2011 | Browne | ......... | G06Q 40/00 705/35 |
| 9,582,230 B1 * | 2/2017 | Sankaran | ......... | H04N 1/56 |
| 10,475,131 B1 | 11/2019 | Cabrera et al. | | |
| 2002/0140699 A1 | 10/2002 | Miyadai | | |
| 2005/0060300 A1 | 3/2005 | Stolte et al. | | |
| 2007/0078844 A1 * | 4/2007 | Aoki | ......... | G06F 16/242 |
| 2007/0198390 A1 | 8/2007 | Lazear et al. | | |
| 2010/0257438 A1 | 10/2010 | Becerra, Sr. et al. | | |
| 2012/0036053 A1 * | 2/2012 | Miller | ......... | G06Q 40/123 705/31 |
| 2014/0114823 A1 * | 4/2014 | Pai | ......... | G06Q 40/123 705/31 |

(Continued)

FOREIGN PATENT DOCUMENTS

WO WO-2015199533 A1 * 12/2015 ........... G06F 16/254

OTHER PUBLICATIONS

Chen et al. Senbazuru: A Prototype Spreadsheet Database Management System. Proceedings of the VLDB Endowment. vol. 6, Issue 12, pp. 1202-1205. Aug. 12, 2013. (Year: 2013).*

(Continued)

*Primary Examiner* — Virpi H Kanervo
(74) *Attorney, Agent, or Firm* — Chiesa Shahinian & Giantomasi PC (57) ABSTRACT

Systems and methods for performing data analysis include receiving data for performing analysis from a user. A value associated with a variable is extracted from a first file based on the data. The value associated with the variable is loaded into a second file, the second file including a formula referencing the variable. An output is generated based on the data by calculating the formula based on the value associated with the variable.

20 Claims, 10 Drawing Sheets

(56) References Cited

U.S. PATENT DOCUMENTS

2015/0379591 A1* 12/2015 Massarik ......... G06Q 10/06393
                                                      705/7.39
2016/0078071 A1*  3/2016 McCoy ................ G06F 16/319
                                                      707/741
2016/0294495 A1* 10/2016 Heffernan .......... G06Q 30/0201

OTHER PUBLICATIONS

Non-Final Office Action dated Apr. 3, 2019, in connection with U.S. Appl. No. 15/443,245; 32 pgs.
Final Office Action dated Aug. 15, 2019, in connection with U.S. Appl. No. 15/443,245; 38 pgs.
Graham, "Proxies for the Corporate Marginal Tax Rate", Journal of Financial Economics, 1996, vol. 42, pp. 187-221.
Non-Final Office Action dated Feb. 3, 2020, in connection with U.S. Appl. No. 15/443,245, filed Feb. 27, 2017, 38 pgs.

* cited by examiner

| Variable | Value | Characteristic 1 | Characteristic 2 |
|---|---|---|---|
| Variable 1 | | | |
| Variable 2 | | | |
| Variable 3 | | | |
| Variable 4 | | | |

300

302 → Variable
304 → Value
306 → Characteristic 1, Characteristic 2

| State | No Inc Tax | Variable | Value | Lower Threshold | Upper Threshold | Incremental Tax | Beginning Effective Date | Ending Effective Date |
|---|---|---|---|---|---|---|---|---|
| Alaska | | Tax Rate | 1.00% | 0 | 10000 | 0 | 1/1/2010 | 12/31/2013 |
| Alaska | | Tax Rate | 0.00% | 0 | 25000 | 0 | 1/1/2014 | 12/31/2099 |
| Alaska | | Tax Rate | 2.00% | 25000 | 49000 | 0 | 1/1/2014 | 12/31/2099 |
| Alaska | | Tax Rate | 3.00% | 49000 | 74000 | 480 | 1/1/2014 | 12/31/2099 |
| Alaska | | Tax Rate | 4.00% | 74000 | 99000 | 1230 | 1/1/2014 | 12/31/2099 |
| Alaska | | Tax Rate | 5.00% | 99000 | 124000 | 2230 | 1/1/2014 | 12/31/2099 |
| Alaska | | Tax Rate | 6.00% | 124000 | 148000 | 3480 | 1/1/2014 | 12/31/2099 |
| Alaska | | Tax Rate | 7.00% | 148000 | 173000 | 4920 | 1/1/2014 | 12/31/2099 |
| Alaska | | Tax Rate | 8.00% | 173000 | 198000 | 6670 | 1/1/2014 | 12/31/2099 |
| Alaska | | Tax Rate | 9.00% | 198000 | 222000 | 8670 | 1/1/2014 | 12/31/2099 |
| Alaska | | Tax Rate | 9.40% | 222000 | | 10830 | 1/1/2014 | 12/31/2099 |
| Alaska | | Tax Rate | 0.00% | 0 | 0 | 0 | 1/1/2010 | 12/31/2013 |
| Alaska | | Tax Rate | 2.00% | 10000 | 20000 | 100 | 1/1/2010 | 12/31/2013 |
| Alaska | | Tax Rate | 3.00% | 20000 | 30000 | 300 | 1/1/2010 | 12/31/2013 |
| Alaska | | Tax Rate | 4.00% | 30000 | 40000 | 600 | 1/1/2010 | 12/31/2013 |
| Alaska | | Tax Rate | 5.00% | 40000 | 50000 | 1000 | 1/1/2010 | 12/31/2013 |
| Alaska | | Tax Rate | 6.00% | 50000 | 60000 | 1500 | 1/1/2010 | 12/31/2013 |
| Alaska | | Tax Rate | 7.00% | 60000 | 70000 | 2100 | 1/1/2010 | 12/31/2013 |
| Alaska | | Tax Rate | 8.00% | 70000 | 80000 | 2800 | 1/1/2010 | 12/31/2013 |
| Alaska | | Tax Rate | 9.00% | 80000 | 90000 | 3600 | 1/1/2010 | 12/31/2013 |
| Alaska | | Tax Rate | 9.40% | 90000 | | 4500 | 1/1/2010 | 12/31/2013 |
| Alaska | | Apport Payroll | 1 | | | | 1/1/2010 | 12/31/2099 |
| Alaska | | Apport Property | 1 | | | | 1/1/2010 | 12/31/2099 |
| Alaska | | Apport Rounding | 6 | | | | 1/1/2010 | 12/31/2099 |
| Alaska | | Apport Sales | 1 | | | | 1/1/2010 | 12/31/2099 |
| Alaska | | FTI Default | Line 28 | | | | 1/1/2010 | 12/31/2099 |
| Alaska | | Installment 1 | 25.00% | | | | 1/1/2010 | 12/31/2099 |
| Alaska | | Installment 2 | 50.00% | | | | 1/1/2010 | 12/31/2099 |
| Alaska | | Installment 3 | 75.00% | | | | 1/1/2010 | 12/31/2099 |
| Alaska | | Installment 4 | 100.00% | | | | 1/1/2010 | 12/31/2099 |
| Alaska | | Pre or Post | Pre | | | | 1/1/2010 | 12/31/2099 |

Fig. 5

| Metadata:IdType | Standard:Variable | Standard:Total |
|---|---|---|
| Standard:FTIDefault | | |
| Standard:ApportSales | | |
| Standard:ApportProperty | | |
| Standard:ApportPayroll | | |
| Standard:ApportRounding | | |
| Standard:Installment1Per | | |
| Standard:Installment2Per | | |
| Standard:Installment3Per | | |
| Standard:Installment4Per | | |
| Standard:TaxRateDefault | | |
| Standard:LowerThreshold | | |
| Standard:IncrementalTax | | |
| Standard:ScenarioDetails | | |
| Standard:State | | |
| Standard:GroupOrEntity | | |
| Standard:PeriodBegin | | |
| Standard:PeriodEnd | | |
| Standard:Scenario | | |
| Standard:ReportingBasis | | |
| Standard:CalculationHeader | | |
| Standard:FederalTaxableIncome | | |
| Standard:FederalTaxableIncomeLine28 | | |
| Standard:NOLsLine29a | | |
| Standard:SpecialDeductionLine29b | | |
| Standard:FederalTaxableIncomeLine30 | | |
| Standard:FTIToUseInThisState | | |

| | A | B | C |
|---|---|---|---|
| 1 | Metadata:IdType | Standard:State:LawItem | Standard:Total |
| 2 | Standard:FtiDefault | FTI default | Line 28 |
| 3 | Standard:ApportSales | Apport sales | 1 |
| 4 | Standard:ApportProperty | Apport property | 1 |
| 5 | Standard:ApportPayroll | Apport payroll | 1 |
| 6 | Standard:ApportRounding | Apport rounding | 6 |
| 7 | Standard:Installment1Per | Installment 1 percentage | 25.00% |
| 8 | Standard:Installment2Per | Installment 2 percentage | 50.00% |
| 9 | Standard:Installment3Per | Installment 3 percentage | 75.00% |
| 10 | Standard:Installment4Per | Installment 4 percentage | 100.00% |
| 11 | Standard:TaxRateDefault | Tax rate default | 9.40% |
| 12 | Standard:LowerThreshold | Lower threshold | 222,000 |
| 13 | Standard:IncrementalTax | Incremental tax | 10,830 |
| 14 | Standard:DefaultEndingEffectiveForRate1 | Default ending effective date for rate 1 | |
| 15 | Standard:StateTaxRate1 | State tax rate 1 | |
| 16 | Standard:StateTaxRate1PortionOfYear | State tax rate 1 portion of year | 0 |
| 17 | Standard:StateTaxRate2 | State tax rate 2 | |
| 18 | Standard:StateTaxRate2PortionOfYear | State tax rate 2 portion of year | 0 |
| 19 | Standard:NOLCalculationMethod | NOL calculation method | Post |
| 20 | Standard:NOLGroupSchedule | NOL group schedule | Yes |
| 21 | Standard:NOLGroupCalculationOption | NOL group calculation option | 1 |
| 22 | Standard:ScenarioDetails | Scenario details | |
| 23 | Standard:State | State | Alaska |
| 24 | Standard:GroupOrEntity | Entity/Group | Unitary Group |
| 25 | Standard:PeriodBegin | Period begin | 1/1/2014 |
| 26 | Standard:PeriodEnd | Period end | 12/31/2014 |
| 27 | Standard:Scenario | Scenario | Alaska 2014 Unitary Group |
| 28 | Standard:ReportingBasis | Apportionment calculation method | Group |

DATA ANALYSIS ENGINE

TECHNICAL FIELD

The present invention relates generally to data analysis and more particularly to an improved engine for analyzing data.

BACKGROUND OF THE INVENTION

Computer systems are often used to perform various data analysis tasks. Traditionally, programmers create and maintain these systems by hardcoding the necessary variables into the software. However, in many of these systems, these hardcoded variables may soon be out of date, rendering the system ineffective or even unusable. As a result, programmers must reprogram the software to update the hardcoded variables. Extensive testing must then be performed to ensure that the updated system is behaving correctly. This process is time consuming, inefficient, and expensive, thereby limiting the frequency of updates.

As an example, tax software is traditionally implemented by hardcoding tax rules into software. Tax rules are made up of tax laws, tax regulations, and case law. Tax laws and tax regulations change frequency (e.g., from month to month), and are sometimes implemented retroactively. Case law may also be decided at any time, impacting how tax laws are interpreted and implemented. Due to this complexity, experienced tax professionals must work with programmers to incorporate the various computations and interdependencies of tax rules into tax software. This traditional approach for implementing tax software results in several problems. First, the cost of paying both programmers and experienced tax professionals is expensive. Second, updating and testing the updated tax software is time consuming and inefficient, which delays the release to users of the tax software. Third, when tax laws, tax regulations, and case law are hardcoded into software, only programmers can update the tax software.

In accordance with one or more embodiments, an analysis engine is provided that receives data from a user for performing an analysis and generates an output based on the received data. The analysis is performed by the analysis engine based on a value associated with a variable in a first file (e.g., a definitions file) and a formula referencing the variable in a second file (e.g., a calculations file). Advantageously, the analysis performed by the analysis engine may be updated by updating the first and/or second file, without updating the analysis engine itself.

In accordance with one or more embodiments, systems and methods for analyzing data are provided. Data is received from a user for performing analysis. A value associated with a variable is extracted from a first file (e.g., a definitions file) based on the data received from the user. The value associated with the variable is loaded into a second file (e.g., a calculations file). The second file includes a formula referencing the variable. An output based on the user provided data is generated by calculating the formula based on the value associated with the variable.

In accordance with one or more embodiments, the systems and methods are for analyzing tax data. As such, the variable and the formula are for determining a tax result as the output. The variable may be a tax rate.

In accordance with one or more embodiments, the first file may include a characteristic associated with the variable. The characteristic includes a condition defining when the variable is defined by the value. The characteristic may comprise one or more of a lower income threshold, an upper income threshold, an incremental tax, a beginning effective date, and an ending effective date.

In accordance with one or more embodiments, the data received from the user includes data defining boundaries for performing the analysis. The data defining boundaries for performing the analysis may include an entity name, a state, and a time period for which tax results are to be determined. The value associated with the variable is extracted when the data defining boundaries for performing the analysis satisfies the characteristic.

In accordance with one or more embodiments, generating an output includes generating an output on a user interface having a layout defined by the second file. The first file may be a comma separated values file and the second file may be a spreadsheet.

In accordance with one or more embodiments, the second file is identified from a plurality of files based on the variable and the received data.

In accordance with one or more embodiments, a data analysis system includes a computer readable medium and an analysis engine. The computer readable medium stores data received from a user for performing analysis, a first file including first data, and a second file including second data. The first file includes a value associated with a variable. The second file includes a parameter having a value defined by a formula, where the formula is defined in terms of the variable. The analysis engine is configured to extract the value associated with the variable from the first file based on the data, load the value associated with the variable into the second file, and determine the value of the parameter by calculating the formula based on the value associated with the variable.

These and other advantages of the invention will be apparent to those of ordinary skill in the art by reference to the following detailed description and the accompanying drawings.

BRIEF DESCRIPTION OF THE DRAWINGS

FIG. 5 shows an exemplary definitions file for tax analysis, in accordance with one embodiment;

FIG. 7B shows an illustrative calculations file loaded with values of variables extracted from a definitions file during operation of the analysis engine, in accordance with one embodiment;

DETAILED DESCRIPTION

Figure 1:
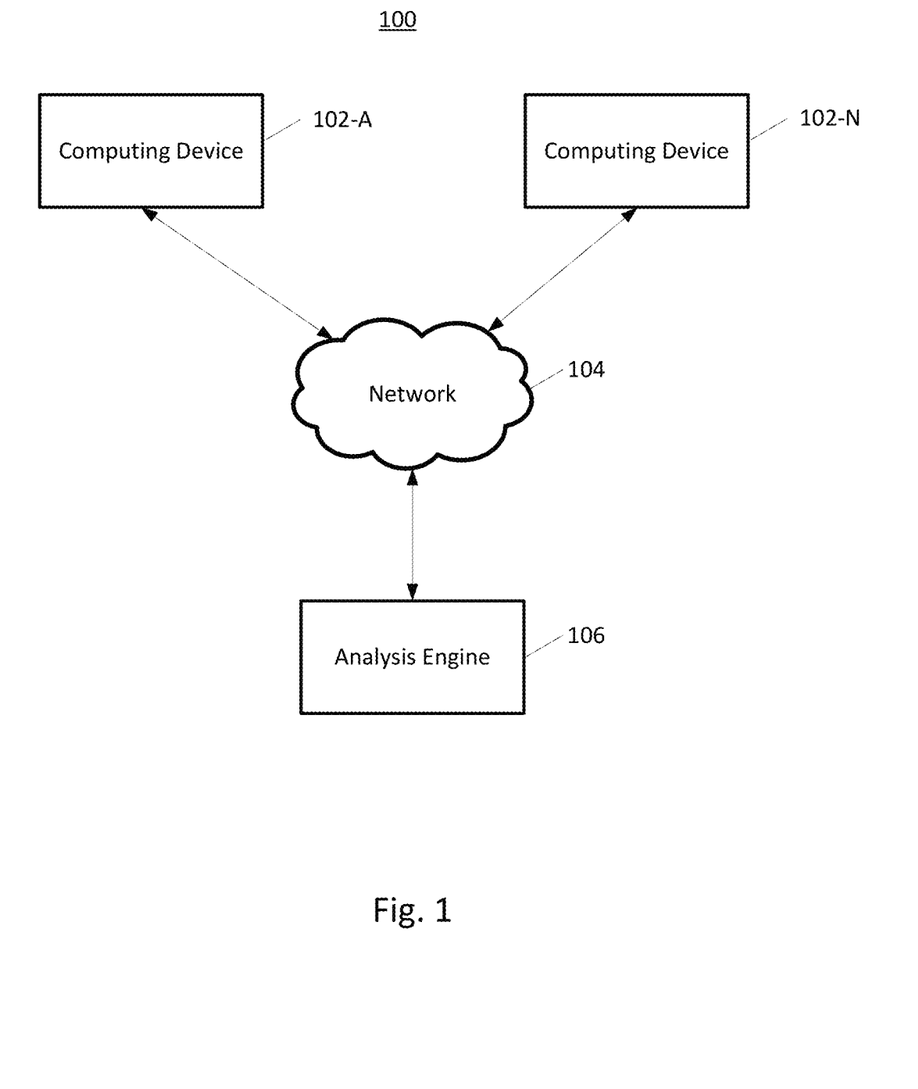
FIG. 1 shows a high-level diagram of a communications system, in accordance with one embodiment.

FIG. 1 shows a high-level diagram of a communications system 100, in accordance with one or more embodiments.

Communications system 100 includes computing devices 102-A, . . . , 102-N (collectively referred to as computing devices 102). Computing devices 102 may comprise any type of computing device, such as, e.g., a computer, a tablet, or a mobile device. Computing devices 102 are operated by users for communicating via network 104. Network 104 may include any type of network or combinations of different types of networks, and may be implemented in a wired and/or a wireless configuration. For example, network 104 may include one or more of the Internet, an intranet, a local area network (LAN), a wide area network (WAN), a Fibre Channel storage area network (SAN), a cellular communications network, etc.

Users of computing devices 102 may communicate via network 104 for interacting with an analysis engine 106 for the analysis of data. For example, users may interact with analysis engine 106 via an interface of a web browser executing on computing device 102, an application executing on computing device 102, an app executing on computing device 102, or any other suitable interface for interacting with analyzer engine 106. Analysis engine 106 may be configured to provide any type of data analysis.

Traditionally, computer systems for performing data analysis are implemented by hardcoding variables and formulas into software. However, it may be necessary to update these hardcoded variables and formulas from time to time. These hardcoded variables and formulas are updated by programmers who reprogram the software. This traditional approach for updating such computer systems is time consuming, inefficient, and expensive, which results in higher costs and delayed updates to consumers.

Advantageously, embodiments of the present invention provide for an analysis engine 106, which facilitates updates by referencing data from a definitions file and a calculations file to provide analysis results. In this manner, a user (e.g., a non-programmer) can easily update data in the definitions file and calculations file, without requiring assistance from a programmer. Analysis engine 106 in accordance with embodiments of the invention thus provides for improvement in computer functionality by facilitating updates for an analyzer engine in an efficient, cost effective, and timely manner.

Figure 2:
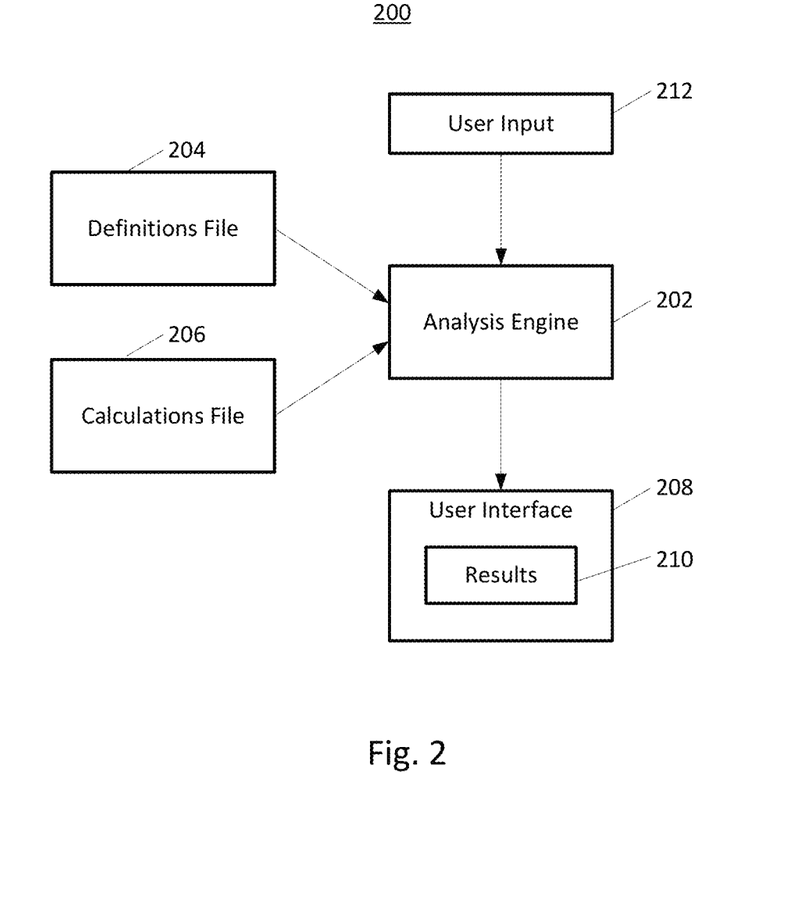
FIG. 2 shows a system architecture for analyzing taxes, in accordance with one embodiment.

FIG. 2 illustratively depicts a system architecture 200 for data analysis, in accordance with one or more embodiments. System architecture 200 includes an analysis engine 202. In one embodiment, analysis engine 202 is analysis engine 106 of FIG. 1. Analysis engine 202 analyzes user input 212 to provide results 210 via user interface 208. Analysis engine 202 performs the analysis based on definitions file 204 and calculations file 206. In this manner, the analysis performed by analysis engine 202 can be updated by updating definitions file 204 and/or calculations file 206.

Figure 3:
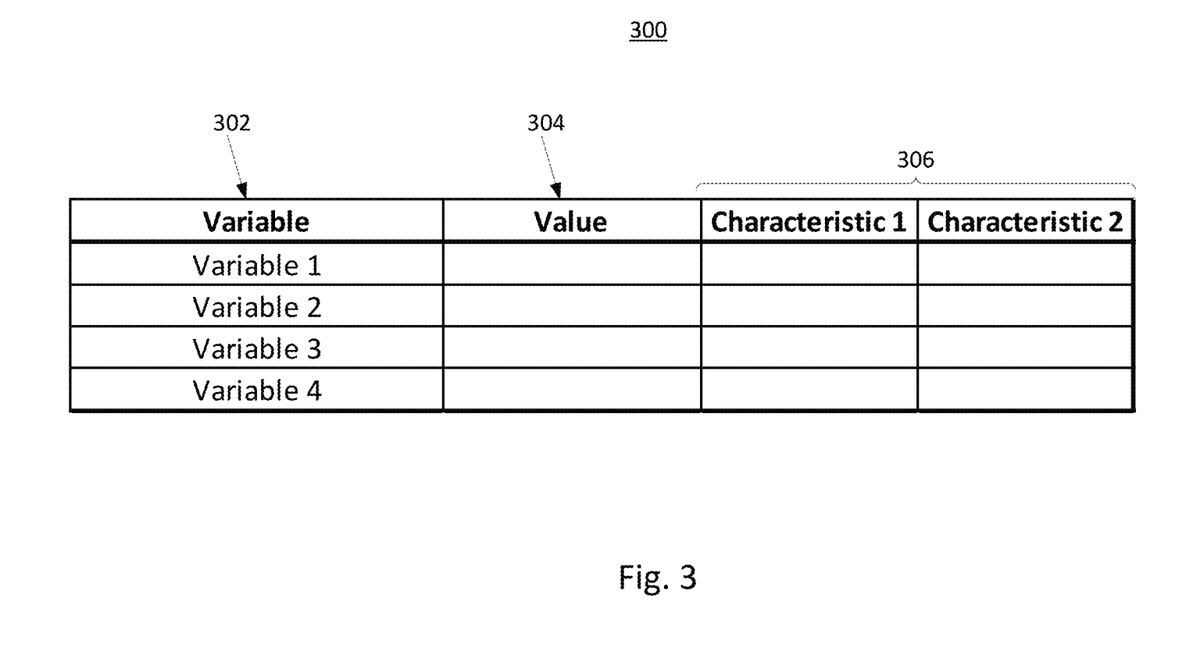
FIG. 3 shows an exemplary definitions file, in accordance with one embodiment.

An exemplary definitions file 300 is shown in FIG. 3, in accordance with one embodiment. Definitions file 300 of FIG. 3 may be definitions file 204 of FIG. 2. In one embodiment, definitions file 300 is formatted as a comma-separated values (CSV) file, but may be of any suitable format. Definitions file 300 may be viewed and edited as a spreadsheet or table, as shown in FIG. 3.

Definitions file 300 includes one or more variables 302 each defined to have a respective value 304. Each variable 302 may be associated with any number of characteristics 306. Characteristics 306 include conditions defining when variables 302 are defined by values 304. Characteristics 306 may also provide other information or indications. Characteristics 306 are represented in definitions file 300 as columns. In this manner, a characteristic value for characteristic 306 associated with variable 302 is indicated in definitions file 300 in the cell intersecting the row of the variable 302 and column of the characteristic 306.

Figure 4:
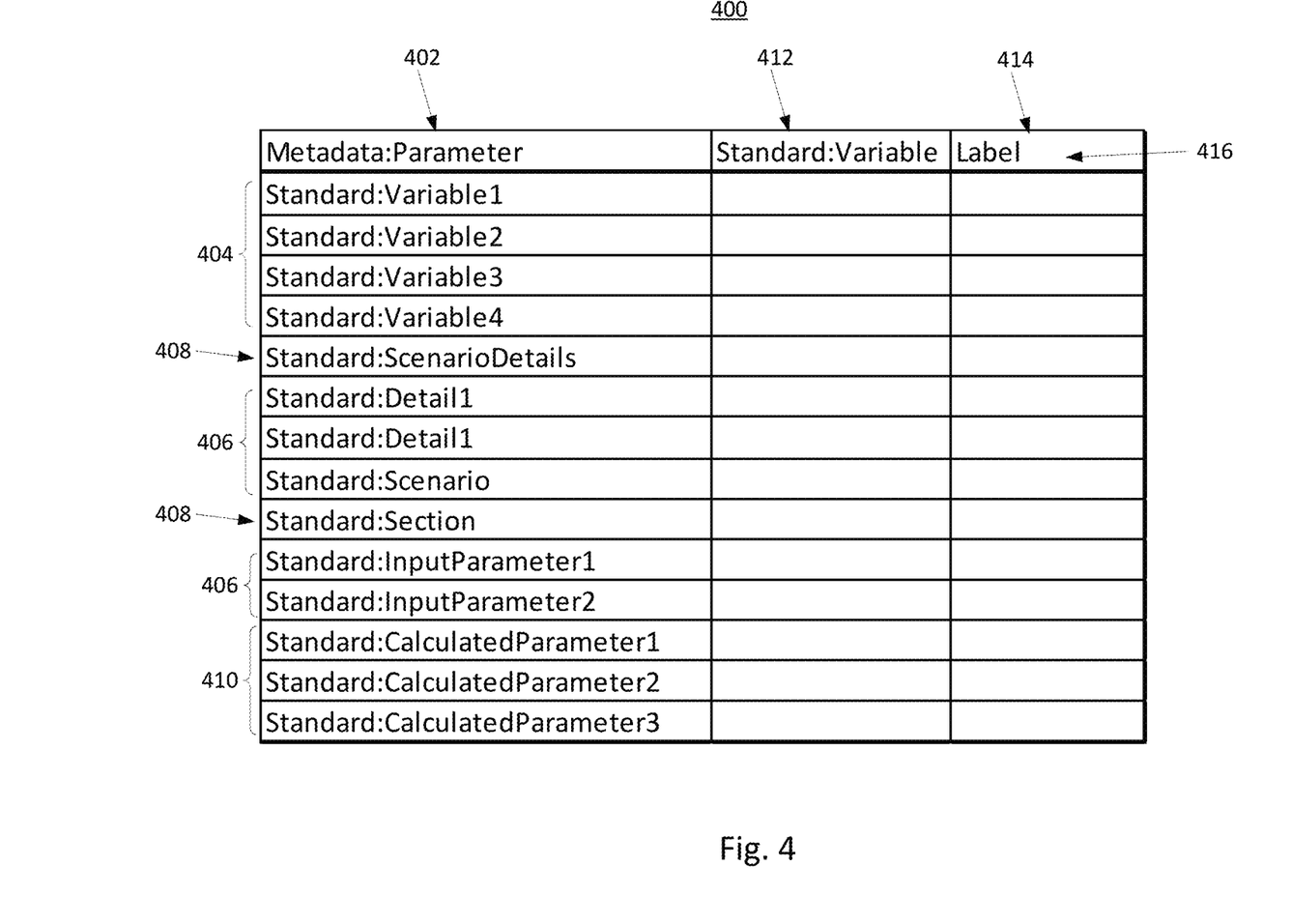
FIG. 4 shows an exemplary calculations file, in accordance with one embodiment.

An exemplary calculations file 400 is shown in FIG. 4, in accordance with one embodiment. Calculations file 400 of FIG. 4 may be calculations file 206 of FIG. 2. In one embodiment, calculations file 400 has a format of a spreadsheet file (e.g., Excel), but may be of any suitable format. The spreadsheet file may include a single calculations file or may include a plurality of sub-spreadsheets each corresponding to a calculations file. Calculations file 400 may be viewed and edited as a spreadsheet or table, as shown in FIG. 4.

Calculations file 400 includes parameters 402. Parameters 402 are used by analysis engine 202 to provide results 210. Parameters 402 are identified in calculations file 400 by a system ID in the format "Metadata:IdType" to allow applications to uniquely identify cells in calculations file 400. The first portion of the system ID, "Metadata," indicates the type of row or column in calculations file 400 and the second portion of the system ID, "IdType," indicates the identity of the row or column. For example, FIG. 4 shows a row having a system ID of "Standard:Variable1," which indicates that the row is a standard row and that the identity of the row is for displaying data of Variable1. Other examples of the "Metadata" indicator of the system ID include "Custom," which indicates a custom row created by a user where each row has a unique IdType assigned by an application, and "Entity," which indicates that a column is an entity column where the IdType is the actual entity displayed. Other system IDs may also be employed.

Parameters 402 include parameters 404, 406, 408, and 410. Parameters 404 are associated with variables and/or characteristics defined in definitions file 300, parameters 406 are associated with values defined by user input 212, and parameters 410 are associated with values calculated from formulas. Calculations file 400 may store the formulas as metadata associated with the cell intersecting the row of a respective parameter 410 and column 414. In one embodiment, the formulas are defined by referencing other cells of calculations file 400. In particular, variables are represented in the formulas as a reference to cells in calculations file 400 that store the values of those variables. Calculations file 400 may also include parameter 408 indicating an expandable/collapsible section identifier for the parameters below. Column 412 is used during operation of analysis system 202 to store names associated with parameters 402 and column 414 is used during operation of analysis system 202 to store values associated with parameters 402.

In one embodiment, calculations file 400 represents cells in column 414 to indicate that the values are defined by user input, that the values are calculated from a formula that a user can override, and to signify the start or end of a section. For example, cells in column 414 may be shaded as follows: white cells indicate cells where a user will input data (e.g., as user input 212), blue cells indicate cells associated with a formula (or a system provided value) that a user can override, and gray cells indicate the start/end of a section in user interface 208 that is expandable and collapsible. Other indicators may additionally or alternatively be employed. The shading is presented with results 210 on user interface 208 but is not used by analysis engine 202 during operation. In one embodiment, analysis engine 202 maintains an audit trail of all changes, including overrides of formulas or system provided values from user input 212. As such, analysis engine 202 enables a user to revert a change to a system default value (e.g., a value associated with a formula or a system provided value).

During operation of analysis engine 202 of FIG. 2, with reference to definitions file 300 of FIG. 3 as definitions file 204 and calculations file 400 of FIG. 4 as calculations file 206, a user transmits user input 212 (e.g., via computing device 102) to analysis engine 202. In some embodiments, user input 212 is previously stored in a database (not shown) and retrieved by analysis engine 202. User input 212 includes data for performing the analysis. For example, the data may define a scenario defining boundaries for performing the analysis by, e.g., defining a particular entity and a particular time period for which the analysis is to be performed. User input 212 may also define a label (e.g., a project name or folder name) for organizing results 210 and associated data of the scenario. The label facilitates recalling or comparing results for different scenarios.

Analysis engine 202 identifies particular variables 302 in definitions file 300 that satisfy the defined scenario. In one embodiment, where a variable 302 is associated with characteristics 306, a value 304 is extracted where the characteristics 306 satisfy the defined scenario. For example, a value 304 for a variable 302 is extracted where a characteristic 306 defining an effective date range is within a date range defined for the scenario. In some embodiments, the particular variables 302 are determined as the variables associated with an industry that an entity (defined by user input 212) belongs to. Analysis engine 202 extracts values 304 associated with the particular variables 302.

Analysis engine 202 identifies calculations file 400 to perform the analysis based on the particular variables 302 and the defined scenario. For example, a plurality of calculations files (or sub-spreadsheets in a single file) may be available for performing different types of analysis (e.g., an analysis of a single entity or an analysis to compare multiple entities). Analysis engine 202 selects calculations file 400 based on the identified particular variables 302 and the defined scenario defining the type of analysis to perform.

Analysis engine 202 provides results 210 via user interface 208 for a scenario defined by user input 212 based on values 304 of variables 302 extracted from definitions file 300 and the calculating logic (e.g., implemented by formulas) defined by calculations file 400. It should be understood that analysis engine 202 may receive and extract data from any number of files, and is not limited to definitions file 300 and calculations file 400. In one embodiment, one of ordinary skill in the art would understand how to generate programming code for implementing analysis engine 202 to provide results 210 for user input 212 based on data extracted from values file 300 and calculations file 400.

Analysis engine 202 is configured to use calculations file 400 as a template defining the layout of results 210 presented on user interface 208. For example, analysis engine 202 may load calculations file 400 into memory to use as a template for the layout of results and perform operations for determining values of the parameters as defined in the layout.

Analysis engine 202 first identifies rows of the layout defined in calculations file 400 that correspond to parameters 404 (i.e., rows associated with variables and/or characteristics defined in definitions file 300). In one example, analysis engine 202 identifies the rows corresponding to parameters 404 based on the calculations file that was selected (e.g., by accessing metadata associated with calculations file 400 that identify the rows corresponding to parameters 404). Analysis engine 202 loads the extracted values 304 of the particular variables 302 into the cell intersecting a row for a respective parameter 404 and column 414. Analysis engine 202 also loads data for the analysis, which may include loading names of parameters 402 in column 412 and data defining the scenario (received as user input 212) in column 414 for parameters 406. In one embodiment, analysis engine 202 additionally loads data (e.g., common entity data) from other components.

Analysis engine 202 then presents an output as, e.g., a table or spreadsheet to a user via user interface 208. The output is generated based on the layout defined in calculations file 400. In one embodiment, analysis engine 202 presents the layout of calculations file 400 with the column listing parameters 402 hidden and the rows listing parameters 404 hidden. Other formats and configurations for presenting the output on user interface 208 are also contemplated.

The output is presented via user interface 208 to receive a same or an additional user input 212 comprising data to be analyzed. Analysis engine 202 performs the analysis by calculating the formulas defined in calculations file 300 based on values 304 of the particular variables 302 extracted from definitions file 300 (and loaded into calculations file 300) and the data to be analyzed received as user input 212 into calculations file 300 to provide results 210.

The results 210 presented on user interface 208 may include a table having a first column corresponding to column 412 to list a name for each parameter 402 of calculations file 400 as a row (except for the hidden rows of parameters 404 in accordance with one embodiment). The results 210 presented on user interface 208 may also include a second column corresponding to column 414 presenting values associated with each parameter 402 in the first column. The cells in column 414 may be associated with formulas or may be blank indicating that a user is to enter data (e.g., as user input 212).

The formulas in calculations file 400 reference other cells of calculations file 400 to provide the output as results 210. The cells of calculations file 400 referenced by the formulas may include cells in column 412 associated with parameters 404 that define values 304 for variables 302 extracted from definitions file 300. The cells of calculations file 400 referenced by the formulas may also include cells where a user enters the data to be analyzed (e.g., as user input 212). In one embodiment, where a user inputs the data to be analyzed (e.g., as user input 212) into a cell associated with a formula, the inputted data will override the formula with the value entered by the user. As defined in calculations file 400, user interface 208 may present the table having blue cells to indicate to a user that a value is calculated by a formula (or can be overridden by the user input 212) and white cells to indicate to a user that a value is received by the user input 212. Other approaches to visually distinguish the cells in the table presented by user interface 208 are also contemplated. In one embodiment, the second column may include a label 416, such as, e.g., an entity name, that is displayed in the results 210.

It should be understood that the table of results 210 may include additional columns depending on the type of analysis to be performed. For example, the table may include additional columns for each entity defined in the scenario from user input 212 to, e.g., present and compare results.

Analysis engine 202 calculates the formulas in calculations file 400 based on extracted values 304 of variables 302 defined in definitions file 300 (which are loaded into calculations file 400) and the data to be analyzed received as user input 212 to provide results 210. In one embodiment, definitions file 300 and calculations file 400 may be exposed to a user, allowing them to customize how the analysis is performed.

Analysis engine 202 is advantageous in that, while analysis engine 202 may be implemented by a programmer, definitions file 300 and calculations file 400 may be updated and maintained by a non-programmer. As such, the analysis engine 202 itself does not have to be updated in order to update variables and formulas. Updates to definitions file 300 and calculations file 400 can be made by users without requiring the specialized skills of a programmer In one embodiment, analysis engine 202 is configured as a tax analysis engine for the computation of tax results.

Traditional tax software is implemented by hardcoding variables and formulas of tax rules into the programming of the software. In order to update these variables and formulas, experienced tax professionals must work with programmers to reprogram the software. This traditional approach is time consuming, inefficient, and expensive, which results in higher costs and delayed updates to consumers.

In accordance with one or more embodiments of the invention, analysis engine 202 may be configured as a tax analysis engine to analyze tax data. Analysis engine 202 for the analysis of tax data receives user input 212, which may comprise tax return information. User input 212 may also include data defining a scenario for the tax results. For example, the scenario may define tax results for an entity (e.g., a corporation) or group of entities (e.g., group of related corporations), one or more states, and a period of time for which tax results are desired. Analysis engine 202 provides tax results 210 of user input 212 based on definitions file 204 and calculations file 206.

FIG. 5 shows an exemplary definitions file 500 for tax analysis, in accordance with one embodiment. Definitions file 500 includes variables 502 defined to have values 504. Variables 502 may include any variable used for tax analysis. In exemplary definitions file 500, variables 502 include a tax rate, an apportionment of payroll, property, rounding, and sales, a federal taxable income (FTI) default, installment payments, and pre or post tax. Each variable 502 is associated with characteristics 506, which include conditions defining when tax variables 502 are defined by values 504. Characteristics 506 may also include other information or indications. Characteristics 506 include, e.g., a state, an indication that there is no income tax, a lower income threshold, an upper income threshold, an incremental tax amount, a beginning effective date, and an ending effective date.

Definitions file 500 is shown in FIG. 5 defining variables 502 for the state of Alaska, but may include any number of states or territories. In one embodiment, definitions file 500 defines variables 502 for every state and territory in the United States having a state income tax. Analysis engine 202 may extract data from definitions file 500 by state (or territory) as needed to optimize performance. For example, analysis engine 202 may extract data from definitions file 500 for a scenario defined by user input 212.

Figure 6:
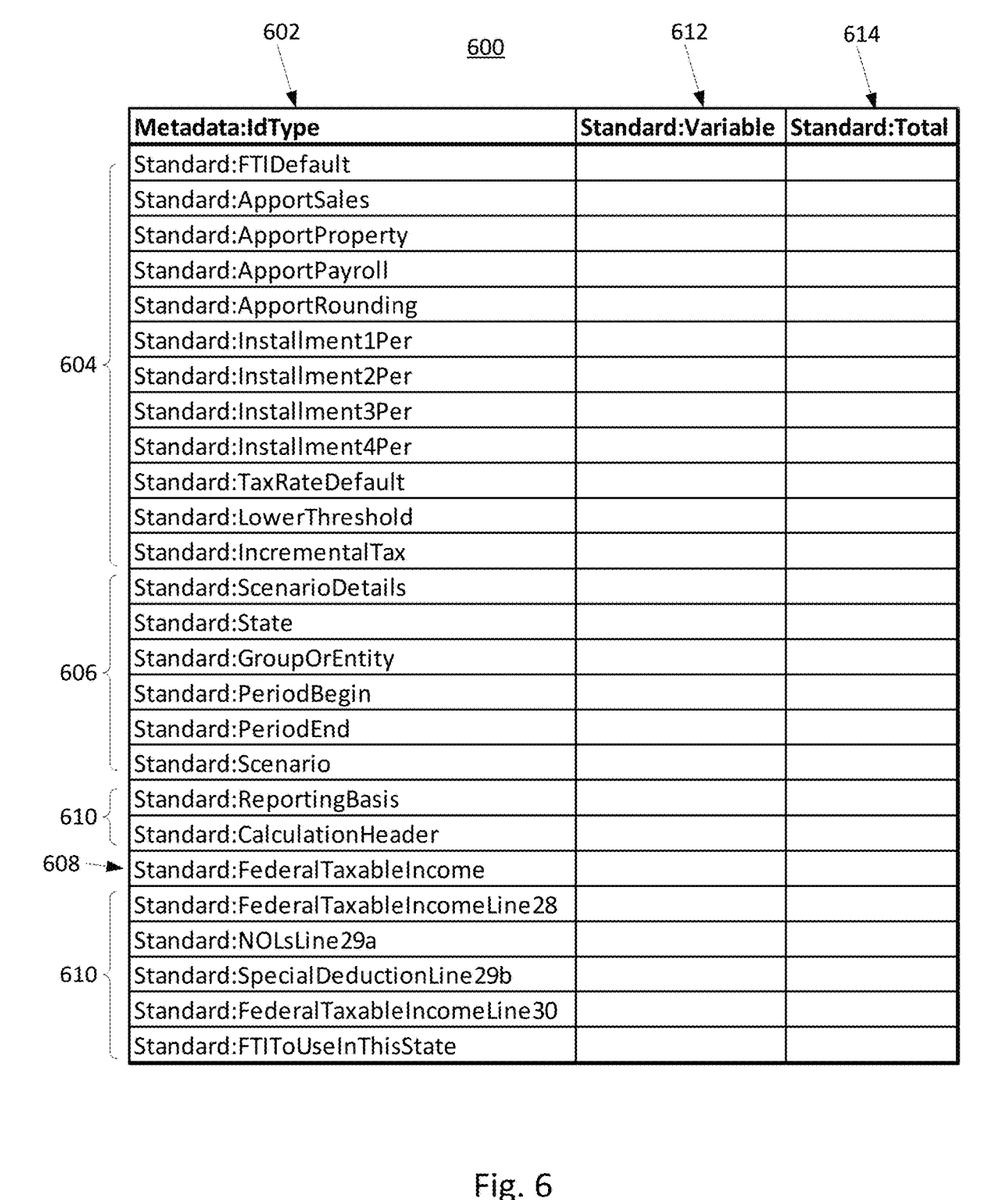
FIG. 6 shows an exemplary calculations file for tax analysis, in accordance with one embodiment.

FIG. 6 shows an exemplary calculations file 600 for tax analysis, in accordance with one embodiment. Calculations file 600 includes parameters 602 in the format of Metadata: Parameter. Parameters 604 are associated with variables and characteristics that are defined in definitions file 500, parameters 606 are defined by user input 212 (e.g., from the data defining the scenario), and parameters 610 are calculated from formulas. Parameter 608 defines an expandable/collapsible section. During operation of analysis engine 202, column 612 is used for storing names associated parameters 602 and column 614 is used for storing values associated parameters 602.

In one embodiment, calculations file 600 defines a layout for presenting results 210 for a single entity. Calculations file 600 may additionally or alternatively include other layouts, such as, e.g., a layout for multiple entities, a layout for pre-apportionment, a layout for post-apportionment, a side-by-side analysis layout, and net operating loss (NOL). In some embodiments, calculations file 600 includes multiple layouts organized in sub-spreadsheets. In other embodiments, analysis engine 202 receives multiple calculations files each corresponding to a different layout.

An advantage of analysis engine 202 for tax analysis is that updates in tax rules can be accounted for by updating definitions file 500 and calculations file 600. As such, updates to definitions file 500 and calculations file 600 can be made by tax professionals and other users without requiring the specialized skills of a programmer. This puts the power of implementing and updating tax automation into the hands of less expensive business analysts and leverages tax professionals and programmers for what they do best. Customers are better served by timely updates (which can happen throughout the year) in smaller portions that are easier to review for quality assurance.

Figure 7A:
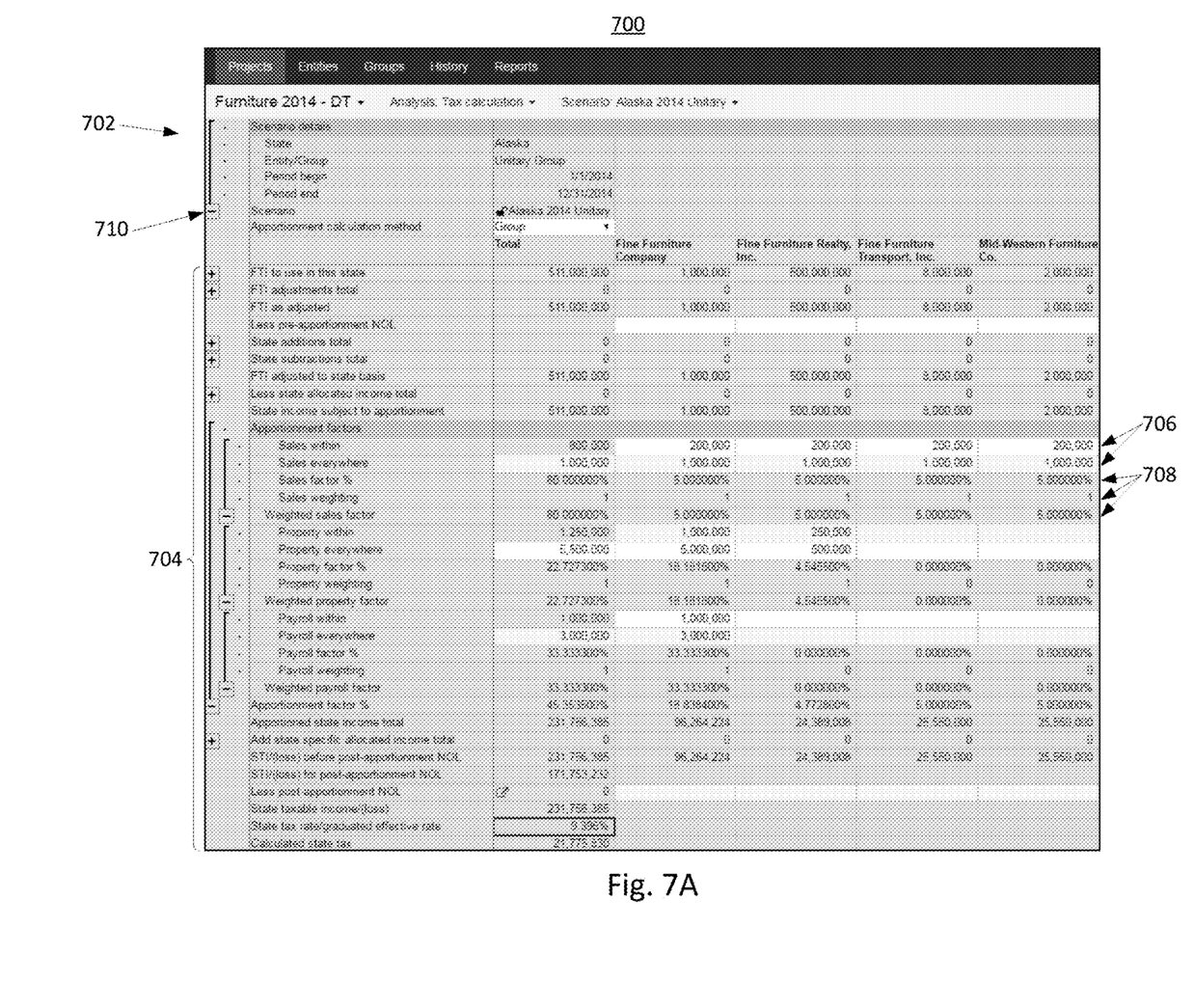
FIG. 7A shows illustrative tax results determined by an analysis engine, in accordance with one embodiment.

FIG. 7A illustratively shows tax results 700 generated by analysis engine 202 performing tax analysis, in accordance with one embodiment. Tax results 700 are shown for a particular scenario 702, defined by user input 212. The scenario 702 is defined for the state of Alaska, for the time period between Jan. 1, 2014 and Dec. 31, 2014, and for a unitary group of four companies. Tax results 700 are generated by analysis engine 202 based on, e.g., definitions file 500 in FIG. 5 and calculations file 600 in FIG. 6.

During operation, tax analysis engine 202 extracts variables 508 in definitions file 500 for the scenario defined by user input 212 to generate tax results 700. The type of analysis, Pre, is also extracted from variable 510 in definitions file 500. Tax analysis engine 202 identifies calculations file 600 for the Pre type of analysis, as identified from variable 510. Calculations file 600 include values 708 of parameters that are calculated by formula and values 706 of parameters that are received as user input 212.

FIG. 7B illustratively shows a portion of a calculations file 750 loaded with values of variables extracted from a definitions file, in a state during operation of tax analysis engine 202, in accordance with one embodiment. Tax analysis engine 202 may load calculations file 600 with values of variables extracted from definitions file 500 to provide loaded calculations file 750. Parameters 754 of loaded calculations file 750 are associated with variables 502 having values 504 defined in definitions file 500. Tax analysis engine 202 stores values 504 associated with parameters 754 in column 752.

Tax analysis engine 202 generates results 210 on user interface 208 as tax results 700 in FIG. 7A by presenting the table defined in loaded calculations file 750 with rows for parameters 754 and column 756 hidden. Tax results 700 include sections that are expandable and collapsible, as indicated by symbol 710. Tax professionals and other non-programmers are able to define the parameters 704 calculated in tax results 700, and the variables and formulas for calculating the parameters, by modifying definitions file 500 and/or calculations file 600.

Figure 8:
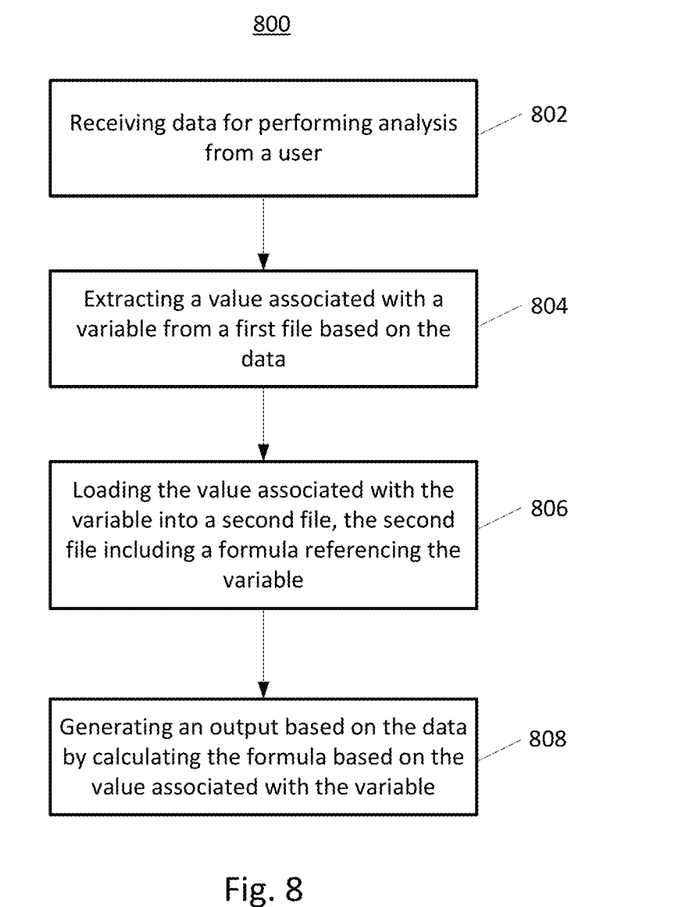
FIG. 8 illustratively depicts a flow diagram of a method for operating an analysis engine, in accordance with one embodiment.

FIG. 8 shows a flow diagram of a method 800 of operation of the analysis engine 202, in accordance with one or more embodiments.

At step 802, data for performing analysis is received from a user. The received data includes data to be analyzed, such as, e.g., tax return information. The received data may also include data defining boundaries for performing the analysis, such as, e.g., an entity or group of entities, one or more states, and a period of time for which tax results are to be determined.

At step 804, a value associated with a variable is extracted from a first file (e.g., definitions file 204) based on the received data. In one embodiment, the first file is a comma separated values (CSV) file. The variable may be a variable for determining a tax results as the output. For example, the variable may include a tax rate, apportionment of payroll, apportionment of property, apportionment rounding, apportionment of sale, federal taxable income (FTI) default, installments, and pre or post.

The first file may also include a characteristic associated with the variable. The characteristic may include conditions defining when the variable is defined by the value. For example, the characteristic may include one or more of a lower income threshold, an upper income threshold, an incremental tax, a beginning effective date, and an ending effective date. The variable is defined by the value when the data defining boundaries for performing the analysis satisfies the characteristic At step 806, the value associated with the variable is loaded into a second file (e.g., calculations file 206). The second file includes a formula referencing the variable. In one embodiment, the second file is a spreadsheet (e.g., an Excel file). The formula may be for determining a tax result as the output. In one embodiment, the second file is selected from a plurality of files based on the variable and the received data.

At step 808, an output is generated based on the received data by calculating the formula based on the value associated with the variable. In one embodiment, the output is generated on a user interface having a layout defined by the second file. An updated output may be generated by updating the first file and the second file.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 8. Certain steps of the methods described herein, including one or more of the steps of FIG. 8, may be performed by a server or by another processor in a network-based cloud-computing system. Certain steps of the methods described herein, including one or more of the steps of FIG. 8, may be performed by a client computer in a network-based cloud computing system. The steps of the methods described herein, including one or more of the steps of FIG. 8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
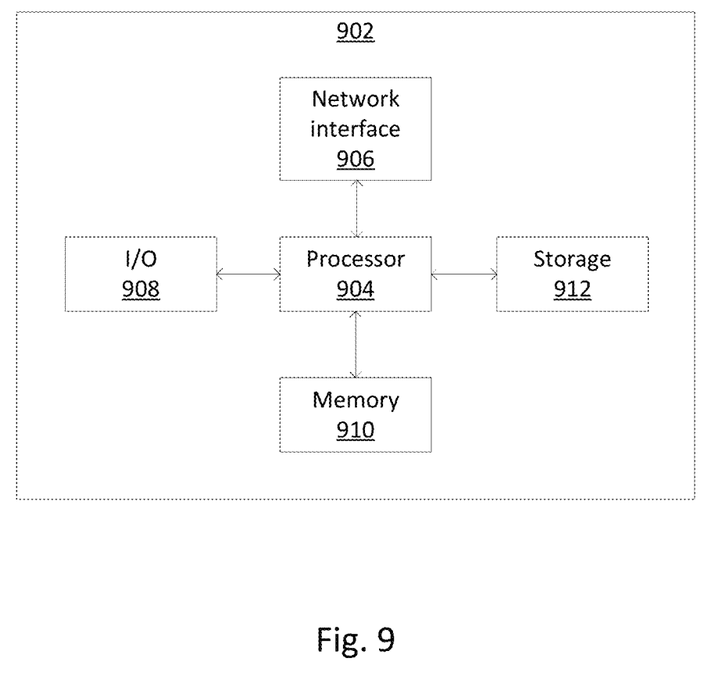
FIG. 9 shows a high-level block diagram of a computer for an analysis engine, in accordance with one embodiment.

A high-level block diagram 900 of an example computer that may be used to implement systems, apparatus, and methods described herein is depicted in FIG. 9. Computer 902 includes a processor 904 operatively coupled to a data storage device 912 and a memory 910. Processor 904 controls the overall operation of computer 902 by executing computer program instructions that define such operations. The computer program instructions may be stored in data storage device 912, or other computer readable medium, and loaded into memory 910 when execution of the computer program instructions is desired. Thus, the method steps of FIG. 8 can be defined by the computer program instructions stored in memory 910 and/or data storage device 912 and controlled by processor 904 executing the computer program instructions. For example, the computer program instructions can be implemented as computer executable code programmed by one skilled in the art to perform the method steps of FIG. 8. Accordingly, by executing the computer program instructions, the processor 904 executes the method steps of FIG. 8. Computer 902 may also include one or more network interfaces 906 for communicating with other devices via a network. Computer 902 may also include one or more input/output devices 908 that enable user interaction with computer 902 (e.g., display, keyboard, mouse, speakers, buttons, etc.).

Processor 904 may include both general and special purpose microprocessors, and may be the sole processor or one of multiple processors of computer 902. Processor 904 may include one or more central processing units (CPUs), for example. Processor 904, data storage device 912, and/or memory 910 may include, be supplemented by, or incorporated in, one or more application-specific integrated circuits (ASICs) and/or one or more field programmable gate arrays (FPGAs).

Data storage device 912 and memory 910 each include a tangible non-transitory computer readable storage medium. Data storage device 912, and memory 910, may each include high-speed random access memory, such as dynamic random access memory (DRAM), static random access memory (SRAM), double data rate synchronous dynamic random access memory (DDR RAM), or other random access solid state memory devices, and may include nonvolatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 908 may include peripherals, such as a printer, scanner, display screen, etc. For example, input/output devices 908 may include a display device such as a cathode ray tube (CRT) or liquid crystal display (LCD) monitor for displaying information to the user, a keyboard, and a pointing device such as a mouse or a trackball by which the user can provide input to computer 902.

Any or all of the systems and apparatus discussed herein, including computing devices 102 and analysis engine 106 of FIG. 1 and analysis engine 202 of FIG. 2, may be implemented using one or more computers such as computer 902.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method for performing data analysis, comprising:

receiving, by a processor, data from a user for performing an analysis, wherein the received data comprises data defining boundaries for performing the analysis;

extracting, by the processor, one or more values associated with one or more variables from a first spreadsheet file stored in a memory based on 1) the received data and 2) satisfying one or more conditions stored in the first spreadsheet file based on the received data;

identifying, by the processor, a second spreadsheet file stored in the memory from a plurality of spreadsheet files stored in the memory based on the one or more variables from the first spreadsheet file, the extracted one or more values associated with the one or more variables, and the received data defining boundaries for performing the analysis;

loading, by the processor, the extracted one or more values associated with the one or more variables into the second spreadsheet file, the second spreadsheet file including a formula defined in terms of at least one of the one or more variables;

calculating, by the processor, a result of the formula based on the extracted one or more values associated with the one or more variables; and generating, by the processor, an output on a user interface of a computing device, wherein the output comprises the calculated result of the formula.

2. The computer implemented method as recited in claim 1, wherein the one or more variables and the formula are for determining a tax result as the output.

3. The computer implemented method as recited in claim 2, wherein the one or more variables include a tax rate.

4. The computer implemented method as recited in claim 1, wherein the one or more conditions comprise one or more of a lower income threshold, an upper income threshold, an incremental tax, a beginning effective date, and an ending effective date.

5. The computer implemented method as recited in claim 1, wherein extracting, by the processor, the one or more values associated with the one or more variables from the first spreadsheet file comprises extracting the one or more values associated with the one or more variables when the data defining boundaries for performing the analysis satisfies the one or more conditions.

6. The computer implemented method as recited in claim 1, wherein the data defining boundaries for performing the analysis comprises an entity name, a state, and a time period for which tax results are to be determined.

7. The computer implemented method as recited in claim 1, wherein generating the output comprises generating the output on the user interface having a layout defined by the second spreadsheet file.

8. The computer implemented method as recited in claim 1, further comprising:

generating, by the processor, an updated output by updating the first spreadsheet file and the second spreadsheet file.

9. A non-transitory computer readable storage medium storing computer program instructions for analyzing data, which, when executed on a processor, cause the processor to perform operations comprising:

receiving data from a user for performing an analysis, wherein the received data comprises data defining boundaries for performing the analysis;

extracting one or more values associated with one or more variables from a first spreadsheet file stored in a memory based on 1) the received data and 2) satisfying one or more conditions stored in the first spreadsheet file based on the received data;

identifying a second spreadsheet file stored in the memory from a plurality of spreadsheet files stored in the memory based on the one or more variables from the first spreadsheet file, the extracted one or more values associated with the one or more variables, and the received data defining boundaries for performing the analysis;

loading the extracted one or more values associated with the one or more variables into the second spreadsheet file, the second spreadsheet file including a formula defined in terms of at least one of the one or more variables;

calculating a result of the formula based on the extracted one or more values associated with the one or more variables; and generating an output on a user interface of a computing device, wherein the output comprises the calculated result of the formula.

10. The non-transitory computer readable storage medium as recited in claim 9, wherein the one or more variables and the formula are for determining a tax result as the output.

11. The non-transitory computer readable storage medium of claim 10, wherein the one or more variables include a tax rate.

12. The non-transitory computer readable storage medium as recited in claim 9, wherein extracting the one or more values associated with the one or more variables from the first spreadsheet file comprises extracting the one or more values associated with the one or more variables when the received data defining boundaries for performing the analysis satisfies the one or more conditions.

13. The non-transitory computer readable storage medium as recited in claim 9, the operations further comprising:

generating an updated output by updating the first spreadsheet file and the second spreadsheet file.

14. The non-transitory computer readable storage medium of claim 9, wherein the data defining boundaries for performing the analysis comprises an entity name, a state, and a time-period for which tax results are to be determined.

15. The non-transitory computer readable storage medium as recited in claim 9, wherein the one or more conditions comprise one or more of a lower income threshold, an upper income threshold, an incremental tax, a beginning effective date, and an ending effective date.

16. A data analysis system, comprising:

a non-transitory computer readable storage medium configured to store:

data for performing an analysis, wherein the data is received from a user, and wherein the received data comprises data defining boundaries for performing the analysis;

a first spreadsheet file comprising first data, the first data comprising 1) one or more values associated with one or more variables and 2) one or more conditions; and a second spreadsheet file comprising second data, the second data comprising a formula defined in terms of one of at least one of the one or more variables; and A processor configured to:

extract the one or more values associated with the one or more variables from the first spreadsheet file based on 1) the received data and 2) satisfying the one or more conditions based on the received data;

identify the second spreadsheet file stored in the-transitory computer readable storage medium from a plurality of spreadsheet files stored in the-transitory computer readable storage medium based on the one or more variables from the first spreadsheet file, the extracted one or more values associated with the one or more variables, and the received data defining boundaries for performing the analysis;

load the extracted one or more values associated with the one or more variables into the second spreadsheet file; and calculate a result of the formula based on the extracted one or more values associated with the one or more variables, and generate an output on a user interface of a computing device, wherein the output comprises the calculated result of the formula.

17. The data analysis system as recited in claim 16, wherein the one or more variables and the formula are for determining a tax result.

18. The data analysis system as recited in claim 17, wherein the one or more variables include a tax rate.

19. The data analysis system as recited in claim 16, wherein the data defining boundaries for performing the analysis comprises an entity name, a state, and a time-period for which tax results are to be determined.

20. The data analysis system as recited in claim 16, wherein the second data further comprises one or more parameters having one or more values defined by the formula, and wherein the processor is further configured to determine the one or more values of the one or more parameters from the result of the formula.

* * * * *